July 7, 1970 P. T. HOLDEN 3,519,311

HYDRAULIC BRAKE SYSTEM

Filed March 10, 1969

PETER T. HOLDEN, INVENTOR

BY Peter L. Cortes

Attorney

United States Patent Office 3,519,311
Patented July 7, 1970

3,519,311
HYDRAULIC BRAKE SYSTEM
Peter T. Holden, 25 Parky Drive,
Thompsonville, Conn. 06082
Filed Mar. 10, 1969, Ser. No. 805,569
Int. Cl. B60f 17/02
U.S. Cl. 303—10                                    11 Claims

ABSTRACT OF THE DISCLOSURE

In a hydraulic system a braking effect is created by the closure of an orifice through a valve in a conduit through which hydraulic fluid passes. Abrupt closure of the orifice is prevented by a compensating valve assembly which appropriately diminishes the effectiveness of the force urging the first valve into a closed position in response to pressure in the fluid passing through the orifice therein.

BACKGROUND OF THE INVENTION

Although much effort has been directed toward perfection of the design and operation of conventional frictional braking systems and such systems are in widespread use, there remain a number of inherent disadvantages which provide an impetus for the development of alternate systems based upon different principles. Among the principal drawbacks to conventional frictional systems are the large quantities of heat and high temperatures which result from the conversion of kinetic energy into heat energy as a direct and necessary consequence of the application of frictional forces to retard motion. In addition, such braking systems tend to be somewhat inefficient and to involve high levels of equipment cost due to the severe loads upon the contact surfaces and the associated parts, resulting in a need for frequent replacement and/or repair. Moreover, the severity of these problems is proportionate to the momentum developed, so that they are particularly acute in heavy, fast vehicles such as airplanes and the like.

One alternative to a frictional braking system is one in which the flow of hydraulic fluid is utilized to control the freedom of movement of the movable members. If, for example, a rotating member such as a wheel is connected to a hydraulic pump and the fluid from the pump is caused to flow through an adjustable orifice, closure of the orifice will retard the flow of fluid through it and thereby set up a back pressure which will, in turn, retard rotation of the pump elements and the wheel.

It has been found, however, that such a system is not entirely practical due largely to the danger of "hydraulic lock" occurring in the system, which could be caused by closure of the orifice to an excessive extent or at too rapid a rate. The consequences of such a condition include the fracture of components and, with specific regard to vehicles, skidding and loss of control.

Accordingly, it is an object of the present invention to provide a novel and practical hydraulic braking system which avoids many of the drawbacks of the prior art systems.

It is also an object of the invention to provide such a hydraulic braking system wherein maximum braking force can be applied to retard and arrest movement and wherein the effect of the applied force is automatically controlled to prevent hydraulic lock.

Another object is to provide a simple system of the type described in which the effective braking force is dependent upon the momentum of the object.

Still another object is to provide a braking system suitable for use in heavy, fast vehicles which provides the operator with a natural feel in the response of the vehicle and a high level of control during the braking operation.

A still further and more specific object is to provide a compensating device for use in a hydraulic braking system to automatically control the effect of forces applied to arrest movement so as to avoid the occurrence of a "hydraulic lock" in the system.

SUMMARY OF THE INVENTION

It has now been found that the foregoing and related objects can be readily attained in a hydraulic braking system which includes a compensating device. The compensating device comprises a valve section providing a conduit for the flow of fluid therethrough and a braking valve with a normally open, variable orifice for the control of flow of fluid through the conduit. The device also has an actuator section providing a fluid reservoir and a control chamber communicating therewith, and the actuator section also has an actuator for varying the pressure in the reservoir and a normally open compensating valve in the flow path between the reservoir and chamber for regulating the passage of fluid therebetween. Interconnecting means is provided between the braking valve and the control chamber and between the compensating valve and the conduit, and the braking valve and compensating valve are urged toward closed positions in response to pressure in the chamber and conduit, respectively. The effect of elevated pressure created by the activator upon the braking valve is thereby diminished by closure of the compensating valve in response to pressure in the conduit so as to diminish the flow of fluid therethrough.

DETAILED DESCRIPTION OF THE ILLUSTRATED EMBODIMENT

Figure 1:
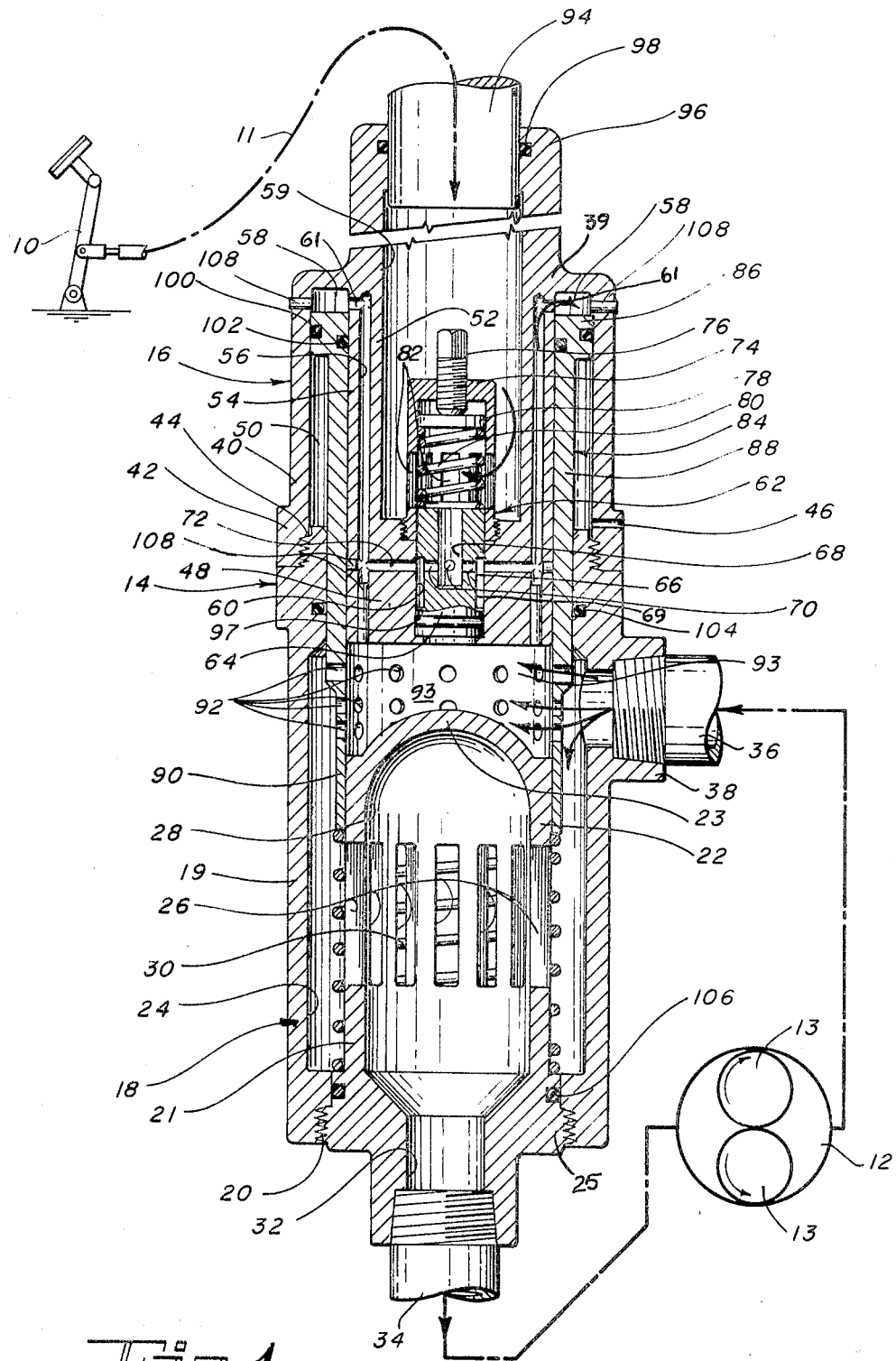
FIG. 1 of the drawing is a partly schematic representation of a hydraulic braking system embodying the present invention with the compensating device thereof shown in sectional elevation.

Turning now in detail to the appended drawing, a hydraulic braking system embodying the present invention includes a foot pedal assembly 10, a hydraulic pump 12 containing counter-rotating elements 13, and a compensating device, generally designated by the numeral 14. The foot pedal assembly 10 is connected to the compensating device 14 through a schematically illustrated hydraulic line 11, and the pump 12 is similarly connected to the compensating device 14 by a pair of schematically illustrated hydraulic lines 34 and 36.

Referring more particularly to the compensating device 14, it is comprised of an actuator section, generally designated by the numeral 16, and a valve section, generally designated by the numeral 18, which are axially aligned and combined as a single unit. The valve section 18 has a side wall 19 with an internally threaded orifice 20 at the lower end thereof which threadably engages the externally threaded portion of the cylindrical valve member 21. The valve member 21 has a cylindrical sidewall 22 with an externally threaded portion 25 adjacent its lower end and a dome-shaped top wall 23, which cooperatively define the internal chamber 28. The sidewall 22 of the valve member 21 is of smaller external width than the internal dimension of the sidewall 19 of the valve section 18 to provide an annular passageway 24 therebetween, and a number of axial slots 26 are provided in the sidewall 22 so as to furnish conduits between the annular passageway 24 and the chamber 28 in the valve member 21.

The annular boss 32 at the lower end of the valve member 21 defines an outlet for the chamber 28, and the hydraulic line 34 is coupled thereto to provide communication between the chamber 28 and the inlet side of the pump 12. One end of the hydraulic line 36 is coupled to the nipple 38 provided by the boss on the sidewall 22 of the valve section 18 and the other end is coupled to the outlet side of the pump 12 to effectively provide, in cooperation with line 34, a circuit for hydraulic fluid from the pump 12, into the annular passageway 24, through the outlet 32 and back to the pump 12, the elements 13 rotating in the directions illustrated by the arrows.

Engaged on the externally threaded shoulder 44 at the upper end of the sidewall 22 of the valve section 18 is the internally threaded surface portion 42 on the sidewall 40 of the body member 39 of the actuator section 16. In this manner, the two sections are readily assembled and disassembled. An atmospheric vent 46 is provided through the sidewall 40 for a purpose to be more fully explained hereinafter. The body member 39 has a core 48 extending coaxially within and spaced inwardly from the sidewall 40 thereof to provide an annular cavity 50 therebetween. Channels 56 are provided therein extending axially from the lower end thereof which, for purposes of description, are bounded by an inside wall portion 52 and an outside wall portion 54; these channels 56 serve as conduits or flow paths for fluid, which communicate with the upper end of the annular cavity 50 through the radial orifices 61. A large bore 59 in the core 48 opening at the upper end thereof provides a cylindrical chamber or reservoir, and the small bore 60 in the lower end thereof provides a conduit therethrough to the lower end of the large bore 59.

A valve subassembly, generally designated by the numeral 62, is threadably engaged in an enlarged portion of the bore 60 and extends within the chamber 59. The piston 64 thereof slidably seats in the axial bore 60 and has an axial bore 68 extending from its upper end and partially through it. A plurality of radial ports 70 provide communication from the axial bore 68 to the circumferential groove 69 on the outside of the piston 64 which slides within the small bore 60. The valve subassembly 62 also includes a cylinder housing 74 with an opening at one end through which the piston 64 slides, and a threaded member 76 is adjustably threadably received in the upper end wall thereof. The pressure disc 78 at the interior end of the threaded member 76 bears against one end of a coil spring 80 which is positioned between the pressure disc 78 and the upper end of the piston 64, and the spring may be preloaded to a desired pressure by adjusting the threaded member 76. The sidewall of cylinder housing 74 is provided with a plurality of parallel radial slots 82, and radial passageways 72 in the lower end of the core 48 provide communication between the flow path afforded by the channels 56 therein and the axial bore 60 of the piston 64.

Slidably mounted between the core 48 and the sidewall 22 of the valve member 21 is a cylindrical control sleeve 84 with a radially outwardly extending circumferential collar 86 at its upper end, which serves to seal a portion of the annular cavity 50 so as to provide an annular chamber 58 thereabove in cooperation with the core 48. The control sleeve 84 also has a midsection 88 and an imperforate closure portion 90 at the lower end thereof. A plurality of radial ports 92 are provided in the midsection 88 to permit fluid to flow from the annular passageway 24 into the chamber 93 defined by the sleeve 84, the top wall 23 of the valve member 21, and the lower end of the core 48. Bearing upwardly against the closure portion 90 is a coil spring 30 which urges the sleeve 84 toward the actuator section 16. The cylindrical neck portion 96 at the upper end of the actuator section 16 slidably seats therein the actuating piston 94 which is movable axially within the cylindrical chamber 59. Sealing action between the several relatively movable members is provided by the O-rings 97, 98, 100, 102, 104 and 106 and plugs 108 are inserted into access holes which are bored to facilitate the provision of bores or passageways through the core 48.

Turning now to the operation of the illustrated hydraulic braking system, the elements 13 of the hydraulic pump 12 are connected to a rotating member (not shown), the movement of which is to be controlled, e.g., the wheels of a vehicle. Movement of the pump elements 13 in the direction indicated by the arrows sets up a flow of hydraulic fluid under pressure through the valve member 21 and along the flow path or circuit previously described.

When it is desired to retard or arrest movement, the pedal assembly 10 is depressed to create a pressure in the hydraulic line 11 and this pressure moves the actuating piston 94 further into the large bore 59 of the actuator section 16. The inward movement of the piston 94 forces hydraulic fluid from the reservoir provided by the bore 59 through the radial slots 82 in the sidewall of the cylinder housing 74, into the axial bore 68 of the piston 64, out of the radial ports 70 therein, through the radial passageways 72, up the channels 56, and finally out the radial orifices 61 into the annular chamber 58. The fluid introduced into the chamber 58 bears directly against the collar 86 of the control sleeve 84 and exerts a force which urges the sleeve 84 downwardly over the axial slots 26 against the opposing force of the coil spring 30, the air vent 46 allowing air to escape during such movement. This movement of the sleeve 84 progressively closes the slots 26 and restricts the passage of hydraulic fluid through valve member 21, which in turn sets up a back pressure and retards movement of the pump elements 13, and ultimately of the wheel associated therewith.

The pressure generated in the valve section 18 is also transmitted by hydraulic fluid which flows through the radial ports 92 in the control sleeve 84 and into the chamber 93 to exert force against the lower end of the piston 64. If sufficient, this force urges the piston 64 upwardly into the cylinder housing 74 against the opposing force of the coil spring 80 therein, and this movement in turn progressively closes the radial slots 82 in the sidewall of the cylinder housing 74. As a result, the flow of hydraulic fluid to the annular chamber 58 is diminished. In this manner, as back pressure within the valve section 18 builds up to a preselected value (as determined by the preset compression of the coil spring 80 through adjustment of the threaded member 76), a compensating effect is introduced by the valve subassembly 62 to prevent locking of the rotating pump elements 13 and hence skidding of the vehicle.

Many variations are possible upon the compensating device specifically described and illustrated, and in the overall system. The variations may be such as to render the device and system simpler or more complex, as the case may be, in order to meet the needs of a given application, but the illustrated embodiment is adaptable to a wide variety of installations with variation in size of the component parts. Although it may be preferred to design the compensating device with both the actuator and the valve sections contained within a single housing from the standpoint of simplicity of design and size of the unit, the device may be provided by two or more separate but interconnected parts. When the compensating device is comprised of more than a single unit, the parts thereof will normally be interconnected through hydraulic lines to convey pressure from the actuator section to the valve section, and vice versa. However, the interconnecting means need not necessarily be hydraulic, and may be mechanical or electrical depending upon the design of the device and suitable modifications of the sections necessary to accommodate such interconnections. For example, the braking valve and/or the compensating valve may be controlled by motors which are actuated by pressure sensors appropriately positioned to detect the pressures existing within the critical portions of the device, i.e., the conduit in the valve section and the chamber in the actuator section. Similarly, the parts of the device may be interconnected by mechanical linkages and suitable auxiliary elements, with suitable pressure-responsive devices being provided where appropriate.

It should be appreciated that the foot pedal assembly illustrated is a schematic representation of brake control means which is utilized for the purpose of simplicity and that any arrangement for creating pressure within the reservoir of the actuator section can be substituted. For example, purely mechanical means (e.g., non-hydraulic) could be used to move the actuating piston in the neck portion of the actuator section, or the piston itself may be contacted directly by the operator. Similarly, the hydraulic pumping means is schematically illustrated for simplicity and represents any suitable type of device, such as a gear pump or the like; thus, the term "hydraulic pump," as used herein, encompasses similar devices which are capable of circulating fluid under pressure.

Although the shaft of a wheel or the like will normally be connected to the pump, any means for driving the pump (and linkages therebetween) may be substituted so long as its motion is essential to the movement of the associated apparatus whereby braking of it will produce braking of the apparatus. Thus, the coupled element will depend entirely upon the particular vehicle or device in which the braking system is employed, and in machinery it may be a drive shaft, spindle or other element thereof.

Due to the numerous applications for which the braking system of the present invention is suitable, no attempt is made to specifically define the dimensions or specifications of the parts employed. The relative size of the parts suggested in the drawing may vary considerably and the relationships shown should not be considered to limit the scope of the invention in any manner. Since it is important that the compensating device be suited to the mechanism in which it is employed, particularly in terms of the potential momentum developed thereby, the size and strength of the springs, for example, will be carefully chosen in accordance with the requirements of the specific machine involved. It is particularly important that the compensating valve mechanism be appropriately designed since it must be capable of controlling the effectiveness of applied pressure so that the maximum braking force is applied and yet the occurrence of hydraulic lock avoided. It is also of some importance that the actuator section be suitably designed to provide a natural feel to the operator during braking, and this is particularly true in the case of vehicles such as airplanes, since in many instances the operator has little else upon which he can place his judgment as to the proper amount of force to apply.

Thus, it can be seen that present invention provides a simple and practical braking system which avoids many of the drawbacks of the prior art systems. The present hydraulic braking system allows a maximum amount of braking force to be applied to retard and arrest movement, with the effect of the applied force being automatically controlled to prevent hydraulic lock and being dependent upon the momentum of the object. The system provides the operator with a natural feel and a high level of control during the braking operation, and it is suitable for use in heavy, fast vehicles.

Having thus described the invention, I claim:

1. In a hydraulic braking system, a compensating device comprising a valve section providing a conduit for the flow of fluid therethrough and having a braking valve with a normally open, variable orifice therein for controlling said flow through said conduit; an actuator section providing a fluid reservoir and a control chamber communicating therewith, said actuator section also having an actuator for varying the pressure in said reservoir and a normally open compensating valve with flow path between said reservoir and chamber for regulating the passage of fluid therebetween; and interconnecting means between said braking valve and control chamber and between said compensating valve and conduit, said braking valve and said compensating valve being urged toward closed positions in response to pressure in said chamber and conduit respectively, whereby the effect of elevated pressure created by said actuator upon said braking valve is diminished by closure of said compensating valve in response to pressure in said conduit to diminish the flow of fluid therethrough.

2. The device of claim 1 wherein said interconnecting means are hydraulic.

3. The device of claim 2 wherein said valve section and actuator section are assembled as a single unit, and wherein a portion of said braking valve is directly adjacent said chamber and a portion of said compensating valve is directly adjacent said conduit for direct actuation of said valves by fluid in said chamber and conduit.

4. The device of claim 1 wherein said braking valve comprises an elongated hollow body having a sidewall with a plurality of apertures therethrough, a closure member with an imperforate section slidably mounted on said sidewall in tight-fitting sealing relationship for movement over said apertures for closure thereof in response to elevated pressure in said chamber to cooperatively provide said variable orifice, and biasing means urging said closure member away from said apertures in the normally open position of the orifice of said valve.

5. The device of claim 4 wherein said closure member is a sleeve mounted on the outside surface of said sidewall, wherein said body and sleeve are generally cylindrical, and wherein said biasing means is a coil spring disposed about said body adjacent said imperforate section and bearing thereupon, said body being closed at one end and open at the other end with the flow path between said open end and said apertures providing a portion of said conduit.

6. The device of claim 1 wherein said compensating valve comprises an elongated hollow body having a sidewall with a plurality of apertures therethrough, a closure member having an imperforate section slidably mounted on said sidewall in tight-fitting sealing relationship for movement over said apertures for closure thereof in response to pressure in said conduit, and biasing means urging said closure member away from said apertures in the normally open portion of said valve.

7. The device of claim 6 wherein said body is generally cylindrical and closed at one end, wherein said closure member is a piston mounted within said body, and wherein said biasing means is a coil spring mounted within said body adjacent said imperforate section and bearing thereupon.

8. The device of claim 7 wherein adjustable means is provided for adjusting the compression of said coil spring to regulate the level of pressure in said conduit required to overcome the biasing force of said spring and urge said piston toward the closed position of said compensating valve.

9. A hydraulic braking system comprising a hydraulic pump; a compensating device; and hydraulic lines interconnecting said hydraulic pump with said compensating device, said compensating device comprising a valve section providing a conduit for the flow of fluid therethrough and having a braking valve with a normally open, variable orifice therein for controlling said flow through said conduit; an actuator section providing a fluid reservoir and a control chamber communicating therewith, said actuator section also having an actuator for varying the pressure in said reservoir and a normally open compensating valve with flow path between said reservoir and chamber for regulating the passage of fluid therebetween; and interconnecting means between said braking valve and control chamber and between said compensating valve and conduit, said braking valve and said compensating valve being urged toward closed positions in response to pressure in said chamber and conduit respectively, said lines being connected to said valve section to permit hydraulic fluid to flow therebetween, said compensating device operating to diminish the effect of elevated pressure created by said actuator upon said braking valve by closure of said compensating valve in response to pressure in said conduit to diminish the flow of fluid therethrough.

10. The system of claim 9 wherein said interconnecting means are hydraulic, wherein said valve section and actuator section are assembled as a single unit, and wherein a portion of said braking valve is directly adjacent said chamber and a portion of said compensating valve is directly adjacent said conduit for direct actuation of said valves by fluid in said chamber and conduit.

11. The system of claim 9 wherein said braking valve comprises an elongated hollow body having a sidewall with a plurality of apertures therethrough, a closure member with an imperforate section slidably mounted on said sidewall in tight-fitting sealing relationship for movement over said apertures for closure thereof in response to elevated pressure in said chamber to cooperatively provide said variable orifice, and biasing means urging said closure member away from said apertures in the normally open position of the orifice of said valve; and wherein said compensating valve comprises an elongated hollow body having a sidewall with a plurality of apertures therethrough, a closure member having an imperforate section slidably mounted on said sidewall in tight-fitting sealing relationship for movement over said apertures for closure thereof in response to pressure in said conduit, and biasing means urging said closure member away from said apertures in the normally open portion of said valve.

References Cited
UNITED STATES PATENTS

| | | | |
|---|---|---|---|
| 3,124,220 | 3/1964 | Kell | 303—21 |
| 3,155,197 | 11/1964 | Lee et al. | 188—90 X |
| 3,315,770 | 4/1967 | Wall | 188—92 X |

MILTON BUCHLER, Primary Examiner

J. J. McLAUGHLIN, Jr., Assistant Examiner

U.S. Cl. X.R.

188—90, 92; 303—21